United States Patent [19]

Szalai

[11] Patent Number: 5,275,303

[45] Date of Patent: Jan. 4, 1994

[54] VALVE CLOSURE MECHANISM FOR SEMICONDUCTOR DEPOSITION APPARATUS

[75] Inventor: Laszlo Szalai, Campbell, Calif.

[73] Assignee: Applied Materials, Inc., Santa Clara, Calif.

[21] Appl. No.: 830,809

[22] Filed: Feb. 3, 1992

[51] Int. Cl.⁵ ............................................. B65D 43/26
[52] U.S. Cl. ..................... 220/264; 220/263; 220/343; 220/344; 49/340; 49/344
[58] Field of Search ............... 220/263, 264, 211, 342, 220/343, 344, 260; 49/340, 344

[56] References Cited

U.S. PATENT DOCUMENTS

| | | | |
|---|---|---|---|
| 1,331,005 | 2/1920 | Duncan | 220/344 X |
| 2,547,089 | 4/1951 | Oberst | 220/264 X |
| 2,624,493 | 1/1953 | Porter | 220/263 X |
| 2,835,269 | 5/1958 | Seymour | 220/344 X |
| 4,429,264 | 1/1984 | Richmond | 49/340 X |
| 4,561,563 | 12/1985 | Woods | 220/412 |
| 4,638,597 | 1/1987 | Lybecker | 49/340 |
| 4,735,018 | 4/1988 | Duncan et al. | 49/340 |
| 4,785,962 | 11/1988 | Toshima | 220/260 |

FOREIGN PATENT DOCUMENTS

| | | | |
|---|---|---|---|
| 2649435 | 5/1977 | Fed. Rep. of Germany | 49/340 |
| 2418856 | 11/1979 | France | 49/340 |

*Primary Examiner*—Allan N. Shoap
*Assistant Examiner*—Stephen Cronin
*Attorney, Agent, or Firm*—Craig P. Opperman

[57] ABSTRACT

This invention provides a closure means for an aperture in a semiconductor deposition furnace, the closure means including an aperture cover plate; at least one articulated linkage including at least two arms, the arms being pivotally mounted with respect to each other to define an angle between them such that variation of the angle causes the plate to move between an aperture closing position and an open position in which the plate is clear of the aperture; and an actuator for driving the articulated linkage and for locking the plate in the aperture closing position. The articulated linkage is in the form of a first arm connected to the cover plate, and a second arm for transferring motive force from the actuator to the first arm. As the plate is moved from its open position to its aperture closing position, the angle between the first and second arms changes from a relatively small angle to a relatively large angle.

22 Claims, 3 Drawing Sheets

VALVE CLOSURE MECHANISM FOR SEMICONDUCTOR DEPOSITION APPARATUS

BACKGROUND OF THE INVENTION

1. Field of the Invention

This invention relates to improvements to an apparatus used in semiconductor deposition operations and, more particularly, to an improved means for providing a closure for apertures formed in the walls of such an apparatus.

2. Description of the Prior Art

During the manufacture of semiconductors it is necessary to form layers of depositions on a semiconductor wafer. This would typically be done in a deposition chamber of a processing apparatus, the operation of which is illustrated with reference to FIG. 1 of the accompanying drawings.

In a typical processing apparatus a number of silicon wafers 10 are stacked in a wafer rack 12. Individual wafers 14 are sequentially removed from the rack by means of a robot arm 16 and inserted into a particular chamber 18 through an open aperture or slit 19.

In this figure, four independent chambers 18, 18.1, 18.2 and 18.3 are shown. Each chamber has its own slit, 19, 19.1, 19.2 and 19.3, associated with it and the robot arm 16 services all four chambers. Once the wafer 14 has been inserted into the chamber, the aperture 19 is closed by a mechanism generally referred to as a slit valve closure mechanism 20. For the sake of clarity only one closure mechanism is illustrated, however, in practice a separate closure mechanism exists for each slit 19, 19.1, 19.2 and 19.3. After the slit 19 is closed, the deposition process commences. Once the deposition has been completed, the closure mechanism 20 is operated to open the slit 19 and the wafer is removed from the chamber 18 by the robot arm 16 and inserted into another processing chamber 18.1 or returned to the rack 12.

One prior art slit valve closure mechanism 20 is illustrated in FIG. 2. In this figure a closure 22 for the slit or aperture 19 in the sidewall 34 of a chamber is held in place in a first, sealing position by means of an arm 24 carrying a roller 30 which bears against a wedge-shaped block 26. It is usual to have two identical arm and roller combinations in each slit valve closure mechanism, but, as their operation is identical, only one is described below.

The arm 24 is rotationally mounted on a shaft 28 so as to be rotatable from the sealing position shown to an open position clear of the aperture 19 as indicated by broken lines 24'. During this rotation the closure 22 pivots about a shaft 21 from the sealing position into the open position. Shaft 21 is journalled to suitable brackets (not shown) extending outwardly from sidewall 34. The motive force required to move the arm 24 between these two positions is provided by a piston and cylinder actuator which will be later described with reference to FIG. 3.

As the arm 24 moves in the counter-clockwise direction (in this figure) to lift the closure 22 to close the aperture 19, the roller 30 at the end of the arm 24 bears against the wedge-shaped portion 32 of the block 26. Further counter-clockwise movement of the arm 24 causes the roller 30 to move up the wedge-shaped portion 32 in the direction of increasing thickness across the wedge. This in turn forces the closure 22 to bear with increasing force against the sidewall 34 of the furnace.

It has been determined that the combined force of the two rollers 30 onto the wedge-shaped block 26 can exceed 500 pounds (2.3 kN). The closure 22 seals against the sidewall 34 as a result of a circumferential O-ring 38 mounted in a groove in the closure 22.

During the opening procedure, the arm 24 moves in the clockwise direction and a spring 36 comes into play to break the seal of the closure 22 over the aperture 19 and move the closure 22 away and into its open position.

Now, it is known in the semiconductor manufacturing industry that during a deposition procedure it is essential that contamination of the interior atmosphere of the chamber is reduced to an absolute minimum as such contamination would be detrimental to deposition and related procedures.

Unfortunately, the prior art device described above has the disadvantage that its operation generates particles which tend to contaminate the interior of the furnace. This is because as the roller 30 bears on the wedge-shaped block 26, the large bearing force causes the surface of the wedge-shaped portion 32 to flake. This flaking is exacerbated by the repetitive process of opening and closing of the aperture 20 as wafers are inserted and removed.

Sometimes, when the closure 22 is closed, the O-ring 38 sticks to the sidewall 34. This prevents the spring 36 from releasing the closure 22, from the sidewall 34, in time for the robot arm to pass through.

The effect of these is that the closure 22 interferes with the operation of the robot arm and may possibly destroy the wafer or damage the arm.

A further problem with the prior art device is that it is very difficult to align the two arms (one of which is not shown) to bring equal force to bear on the closure 22. This is particularly so after the device has completed many cycles of opening and closing and the resultant wearing of the mechanism has caused misalignment.

The need therefore has arisen for a means for closing an aperture in a deposition chamber or the like, which can be repeatedly opened and closed without leading to the contamination of the interior of the furnace, which can readily be realigned and readjusted, and which, will provide reliable, repetitive opening and closure of the aperture. Furthermore, if needed, an improved means for closing should preferably be retrofitable to existing valve closure mechanisms with a minimum amount of rework.

SUMMARY OF THE INVENTION

In accordance with the present invention, there is provided an improved means for closing an aperture in the wall of a semiconductor deposition chamber which includes an aperture cover plate, pivotally connected to the wall and rotatable between an open position and an aperture sealing position, and a cover plate carriage including a pair of articulated linkages respectively disposed proximate opposite ends of the plate and pivotally mounted with respect to both the plate and a base. Each linkage includes two members pivotally connected together to form an articulated over-center operating linkage for rotating the plate between its closed position and its open position in which the plate is clear of the aperture. The means for closing also includes one or more actuators for causing the articulated arms to be rotated about the base pivots to effect the opening and closing operation.

One advantage of this invention is that the flaking of material caused by the movement under pressure of the roller onto the wedge-shaped block is done away with. In addition, all the bearing surfaces can be sealed so that in the event flaking does occur, the particles are retained within the bearing assemblies associated with such surfaces. As all the bearings are rotational type bearings, the sliding of material surfaces relative to each other, with resultant flaking, is reduced to a minimum.

Furthermore, the movement of the cover plate into its open position away from the aperture is simplified by the "pulling action" caused by the movement of the members, and does not rely upon the use of the springs that were required in the prior art devices. In addition, since all parts can be made relatively robust and all corrosion sensitive components can be isolated by seals, this type of mechanism will not easily be affected by vapors escaping from the furnace when the plate is in its open position.

Yet a further advantage of the present invention is that it can be retrofitted to existing processing apparatus to replace the prior art means for closing illustrated in FIG. 2.

DESCRIPTION OF THE DRAWINGS

In the accompanying drawings.

DETAILED DESCRIPTION OF THE PREFERRED EMBODIMENTS

Figure 3:
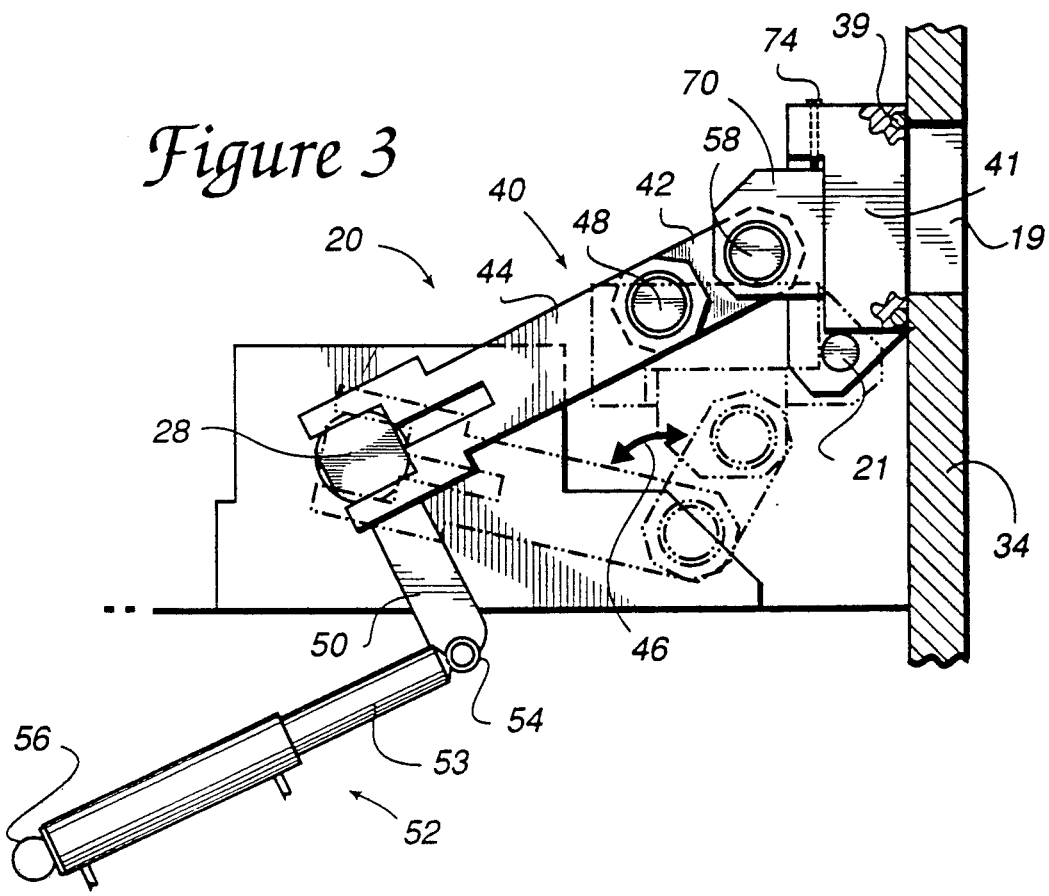
FIG. 3 is side elevational view similar to FIG. 2 showing a means for closing in accordance with the present invention.

In FIG. 3 of the accompanying drawings, a means for closing 20 in accordance with the present invention is shown to comprise an aperture cover plate 41 and an articulated linkage 40 for moving the cover plate. The closure means, as illustrated, appears to have only one linkage. This is as a result of the particular view depicted and it is usual for the means for closing to include at least two identical linkages respectively positioned at opposite ends of the cover plate. Description of only one linkage will, however, suffice.

Figure 2:
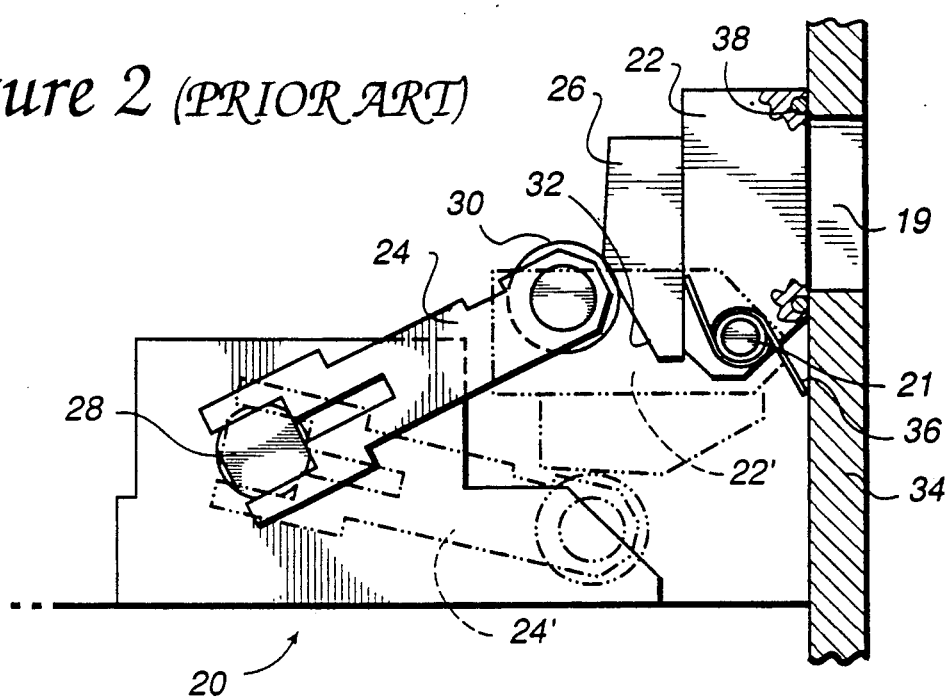
FIG. 2 is side elevational view of a prior art closure means.

In the position illustrated, the cover plate 41 is shown to sealingly close an aperture 19 in the sidewall 34 of a semiconductor deposition furnace in substantially the same way that the aperture was sealed by the prior art devices depicted in FIG. 2. In fact, the illustrated preferred embodiment of the present invention is configured to be a direct replacement for the prior art assembly.

The linkage 40 is shown to be constituted by two articulated members, the first (42) of which is pivotally mounted to the cover plate 41 and the second (44) of which transfers motive force to the first member 42 and is mounted to be rotated by shaft 28. The members 42, 44 are pivotally connected to each other by a shaft 48. The plate 41 is pivotally mounted, at shaft 21, to the wall 34 of the processing chamber to be rotatable, under action of linkage 40, from its sealing position (as shown) to its open position (as shown in broken lines).

As can be seen from this figure the first member 42 and the second member 44 are joined by shaft 48 to operate very much like the forearm and upperarm of the human body. As the angle between the two members 42, 44 is varied, the plate 41 is moved between its first, aperture sealing position and its second, open position (shown in broken lines). In this specific illustration, the angle 46 between the two members becomes larger as the plate 22 moves from its open to its closed position.

At the sealing position of the plate 41, the angle 46 between the members 42, 44 is very close to one hundred and eighty degrees. Although at an angle of one hundred and eighty degrees the members are at their combined optimum reach, with the plate 41 bearing most strongly against the wall 34 of the chamber, this position is a relatively unstable position. Provision is therefore made for the members 42, 44 to continue their movement such that the angle between them becomes ever so slightly greater than one hundred and eighty degrees. This position is termed the over-centered position and is characterized by the fact that the reactional forces in the linkage 40 no longer resist the increase of the angle 46 but, in fact, tend to move the members 42, 44 in the direction to increase the angle 46. In this position, where the angle 46 is slightly greater than one hundred and eighty degrees, however, the members 42, 44 are restrained, in the manner described below, from moving to increase the angle 46. This effectively locks the cover plate in its sealing position.

To enhance the effective seal between the plate 41 and the wall 34 of the chamber, a circumferential O-ring 39 is fitted into a groove formed in the face of the cover plate. Typically, this O-ring would be made of a heat-resistant material which would be resilient and compressible. At the optimum reach position with the members 42, 44 defining an angle of exactly one hundred and eighty degrees with respect to each other, the O-ring 38 is subjected to the greatest compression forces. As the members move into the over-centered, locked position the O-ring acts to bias the plate 41 slightly away from the wall 34. This bias serves to retain the members 42, 44 in the over-centered position. Even though the initial compression of the O-ring is slightly reduced in the over-centered configuration, a good seal of the aperture 19 is still maintained.

Thus it can be seen that this configuration has the advantage of offering a good seal over the aperture 19 while still maintaining the structural stability of the linkage 40.

As is apparent from the above description, the closure mechanism operates as a result of the pivoting of the second member 44 about an axis which is the center of the shaft 28. In operation, the shaft 28 rotates about its longitudinal axis under action of a lever 50 rigidly affixed to the shaft 28. The lever 50 is in turn driven by a pneumatic piston-and-cylinder actuator 52 which is pivotally attached to the lever 50 at point 54. As the lever 50 moves to circumscribe an arc about the longitudinal axis of shaft 28—during the opening and closing operation—the point 54 moves transverse to the actuating axis of the actuator 52. To allow for this movement the actuator 52 is pivotally mounted to its support structure (not shown) at point 56.

When the piston portion 53 of the actuator is extended fully, the arms 42, 44 are in the over centered position and, as the piston cannot extend further, the arms 42, 44 are effectively locked into this position.

Figure 1:
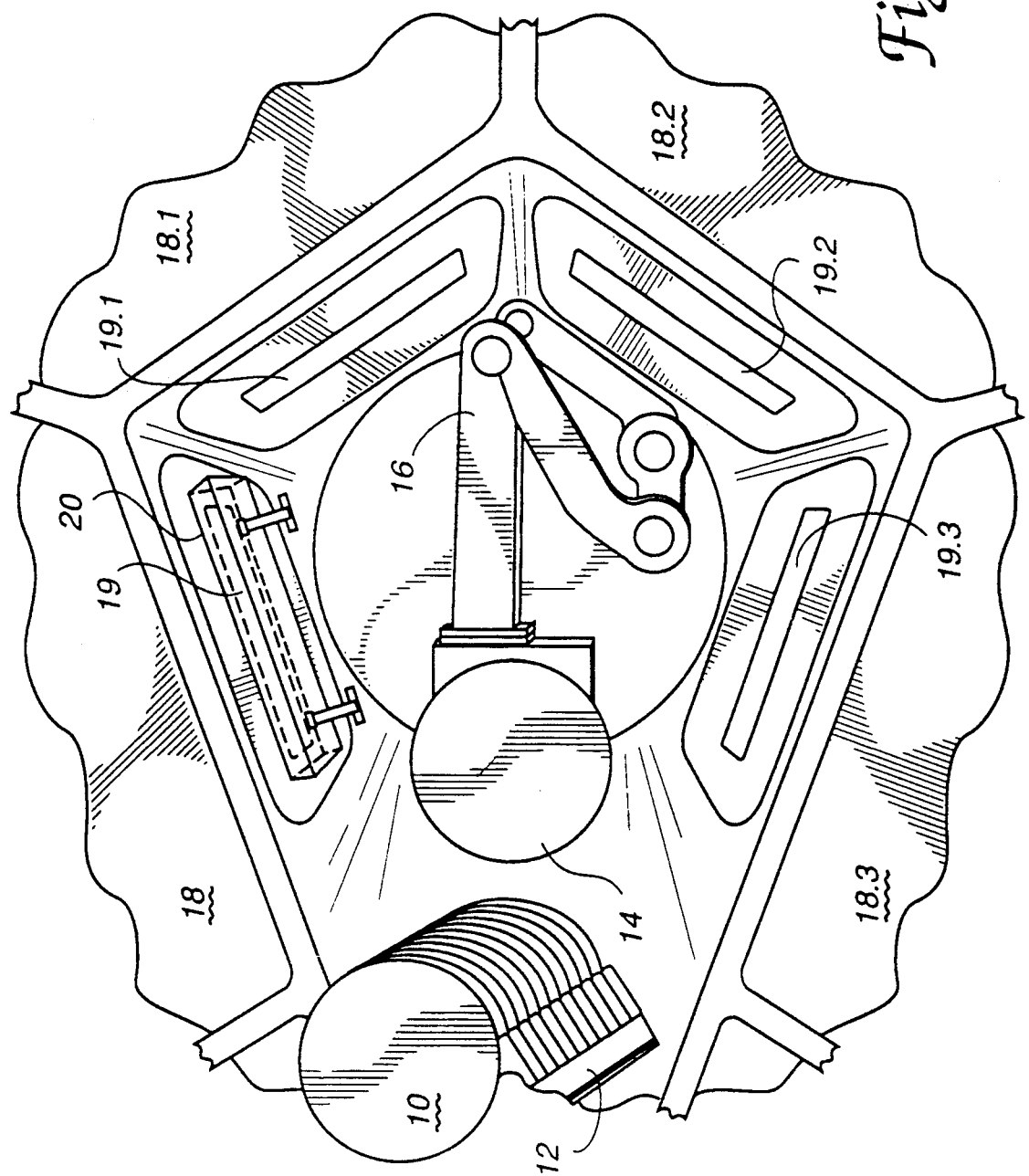
FIG. 1 is a pictorial plan view illustrating a semiconductor processing apparatus having four semiconductor deposition chambers.

The control of the actuator 52, and thereby the control of the opening and closing of the cover plate 41, is synchronized with the movement of the robot arm 16 illustrated in FIG. 1.

Figure 4:
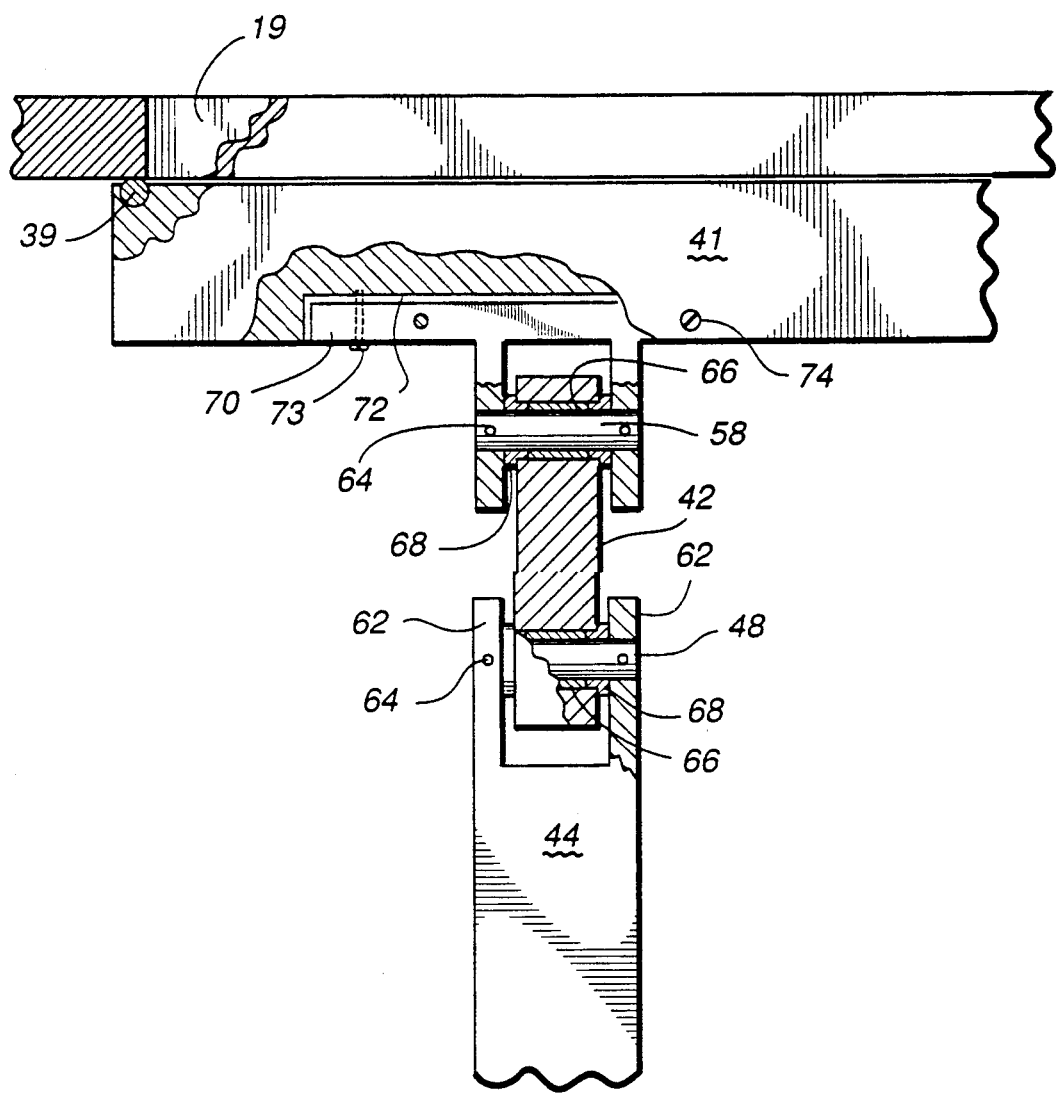
FIG. 4 is a partially broken plan view showing one end of the means for closing of FIG. 3.

Referring now to FIG. 4, it can be seen that the interconnection, at shaft 48, of the members 42, 44 is similar in construction to the interconnection, at shaft 58, of the first member 42 and the cover plate 41. Description of only one connection is therefore all that is required.

The end of member 44 is formed to have a U-shaped configuration across which the shaft 48 passes. The shaft 48 is fixed relative to the arms 62 of the U-shaped formation so that it is unable to rotate about its longitudinal axis. This fixation may be done, for example, by means of screws 64 advanced through tapped bores in the arms 62 and into engagement with the shaft 48. The member 42 is mounted onto the shaft 48 by means of a bearing 66. This bearing 66 may be of any suitable kind, for instance a needle bearing, but must be robust enough to manage the forces generated during closure of the aperture 19. In the event that any wearing of the bearing 66 does occur, teflon seals 68 are located at each end of the shaft to seal the bearing off and retain any particles, caused by the wear, within the bearing itself.

The closure plate 41 is attached to member 42 by a shaft 58 and a yoke 70. This yoke may or may not be an integral part of the closure plate 41. As is illustrated, the yoke 70 is independent of the plate 41 and is mounted within a recess 72 formed therein.

The plate 41 is fixed to the yoke 70 by means of two screws 73 and can be moved for alignment by two other screws 74 which pass through tapped bores in the upper portion of the plate 41 and engage a top surface of the yoke 70. As has been mentioned above, the plate 41 is attached to at least two, synchronized and identical linkages 40, and adjustment and alignment of the plate 41 relative to these linkages as well as to the aperture 19 may be required. The screws 74 make this alignment of the plate possible.

One advantage of the present invention is that it can be retrofitted to existing processing apparatus to replace the prior art means for closing illustrated in FIG. 2.

Another advantage of this invention is that the flaking of material caused by the movement under pressure of the roller 32 onto the wedge-shaped block 26 (FIG. 2) is done away with. In addition, all the bearing surfaces are sealed so that in the event flaking does occur, the particles are retained within the bearing assemblies associated with such surfaces. As all the bearings are rotational type bearings, the sliding of material surfaces relative to each other, with resultant flaking, is reduced to a minimum.

Furthermore, the movement of the closure plate 41 into its open position away from the aperture 19 is simplified by the "pulling action" caused by the movement of the members 42, 44, and does not rely upon the use of the springs 36 that were required in the prior art devices. Finally, since all parts are relatively robust and all corrosion sensitive components are isolated by seals, this type of mechanism will not easily be affected by vapors escaping from the furnace when the plate 41 is in its open position.

While the invention has been particularly shown and described with reference to certain preferred embodiments, it will be understood by those skilled in the art that various alterations and modifications in form and in detail may be made therein. Accordingly, it is intended that the following claims cover all such alterations and modifications as may fall within the true spirit and scope of the invention.

What is claimed is:

1. A means for closing an aperture formed through a wall comprising:
   an aperture cover plate;
   at least one articulated linkage for moving the cover plate between an open position and an aperture closing position, each of said at least one linkage including at least a first member attached to the plate and a second member for pivotally mounting relative to the wall in which the aperture is formed, the members furthermore being pivotally attached with respect to each other to define an angle between them such that increasing the angle causes the plate to move between said aperture closing position and said open position whereby, when the cover plate is in the aperture closing position, said angle between the first and second members, is greater than one hundred and eighty degrees; and
   actuating means for driving said articulated linkage.

2. A means for closing according to claim 1 wherein said actuating means is adapted to rotate said second member in a plane normal to the axis of its pivotal attachment to said first member.

3. A means for closing according to claim 1, further comprising means for releasably locking the cover plate in the aperture closing position.

4. A means for closing according to claim 3 wherein the cover plate further comprises a means for pivotally mounting the plate onto the wall through which the aperture is formed.

5. A means for closing according to claim 4 wherein said actuating means is adapted to rotate said second member in a plane normal to the axis of its pivotal attachment to said first member.

6. A means for closing according to claim 4 wherein the angle between the first and second members becomes smaller as the plate is moved from the closed position to the open position.

7. A means for closing according to claim 6 wherein said actuating means is adapted to rotate said second member in a plane normal to the axis of its pivotal attachment to said first member.

8. A means for closing according to claim 4 wherein the first and second members lock into an over-centered position, when the plate is in the aperture closing position.

9. A means for closing according to claim 8 wherein said actuating means is adapted to rotate said second member in a plane normal to the axis of its pivotal attachment to said first member.

10. A means for closing according to claim 8 wherein the actuating means is a linear actuator having a maximum and minimum throw and at least one of said maximum and minimum throws corresponds to the over-centered configuration of said articulated linkage.

11. A means for closing according to claim 10 wherein said actuating means is adapted to rotate said second member in a plane normal to the axis of its pivotal attachment to said first member.

12. A means for closing according to claim 10 wherein the cover plate includes means for resiliently biasing the cover plate away from the aperture closing position.

13. A means for closing according to claim 12 wherein said actuating means is adapted to rotate said second member in a plane normal to the axis of its pivotal attachment to said first member.

14. A means for closing according to claim 12, wherein the means for resiliently biasing includes a seal for engaging the chamber wall and for providing a seal about the aperture.

15. A means for closing according to claim 14 wherein said actuating means is adapted to rotate said second member in a plane normal to the axis of its pivotal attachment to said first member.

16. A means for closing according to claim 14 wherein the seal is in the form of at least one O-ring.

17. A semiconductor substrate processing apparatus comprising:
   (i) a reactor including at least one wall defining a substrate processing chamber;
   (ii) an aperture formed through one of the at least one wall;
   (iii) an aperture cover plate;
   (iv) at least one articulated linkage for moving the cover plate between an open position and an aperture closing position, each of said at least one linkage including at least a first member attached to the plate and a second member pivotably mounted relative to the wall in which the aperture is formed, the members furthermore being pivotally attached with respect to each other to define an angle between them such that increasing the angle causes the plate to move between said open position and said aperture closing position, and whereby when the cover plate is in the aperture closing position, the angle between the first and second members, is greater than one hundred and eighty degrees; and
   (v) actuating means for driving said articulated linkage.

18. A semiconductor substrate processing apparatus according to claim 17, further comprising biasing means for biasing the cover plate away from the aperture closing position when the plate is in said closing position.

19. A semiconductor substrate processing apparatus according to claim 18, wherein the actuating means and the articulated linkage co-operate to releasably lock the cover plate in the aperture closing position.

20. A semiconductor substrate processing apparatus according to claim 19, wherein the biasing means includes a seal for engaging the chamber wall and for providing a seal about the aperture.

21. A semiconductor substrate processing apparatus according to claim 20, wherein the first and second members lock into an over-centered position when the plate is in the aperture closing position.

22. A semiconductor substrate processing apparatus according to claim 21, wherein the cover plate is pivotally mounted onto the wall through which said aperture is formed.

* * * * *